United States Patent
Ogawa

(10) Patent No.: US 9,422,998 B2
(45) Date of Patent: Aug. 23, 2016

(54) DAMPER

(71) Applicant: KAYABA INDUSTRY CO., LTD., Tokyo (JP)

(72) Inventor: Takayuki Ogawa, Kanagawa (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/408,302

(22) PCT Filed: Aug. 9, 2013

(86) PCT No.: PCT/JP2013/071690
§ 371 (c)(1),
(2) Date: Dec. 16, 2014

(87) PCT Pub. No.: WO2014/030557
PCT Pub. Date: Feb. 27, 2014

(65) Prior Publication Data
US 2015/0152935 A1    Jun. 4, 2015

(30) Foreign Application Priority Data

Aug. 24, 2012 (JP) ................. 2012-185372

(51) Int. Cl.
*F16F 9/48* (2006.01)
*F16F 9/516* (2006.01)
*F16F 9/36* (2006.01)
(Continued)

(52) U.S. Cl.
CPC .................. *F16F 9/48* (2013.01); *F16F 9/516* (2013.01); *F16F 9/187* (2013.01); *F16F 9/19* (2013.01); *F16F 9/364* (2013.01)

(58) Field of Classification Search
CPC ............ F16F 9/187; F16F 9/19; F16F 9/364; F16F 9/48; F16F 6/516
USPC .................................... 188/286, 315, 322.19
See application file for complete search history.

(56) References Cited

U.S. PATENT DOCUMENTS

| | | | | |
|---|---|---|---|---|
| 4,971,180 A | * | 11/1990 | Kobayashi | F16F 9/46 188/282.4 |
| 5,503,258 A | * | 4/1996 | Clarke | F16F 9/48 188/266.5 |
| 6,926,128 B2 | * | 8/2005 | Barbison | B60G 17/08 188/315 |

(Continued)

FOREIGN PATENT DOCUMENTS

| | | |
|---|---|---|
| JP | 55-134538 U1 | 2/1980 |
| JP | 58-184336 A | 10/1983 |

(Continued)

*Primary Examiner* — Thomas Irvin
(74) *Attorney, Agent, or Firm* — Rabin & Berdo, P.C.

(57) ABSTRACT

A damper includes a cylinder, a piston that is inserted into the cylinder, a rod that is connected to the piston, a rod-side chamber and a piston-side chamber that are divided within the cylinder, a tank, an extension-side passage that allows communication between the rod-side chamber and the tank, a compression-side passage that allows communication between the piston-side chamber and the tank, an extension-side damping valve that is provided in the extension-side passage, a first check valve that is provided in the extension-side passage in parallel with the extension-side damping valve, a compression-side damping valve that is provided in the compression-side passage, a second check valve that is provided in the compression-side passage in parallel with the compression-side damping valve, and a center passage that allows communication between the tank and the inside of the cylinder.

5 Claims, 4 Drawing Sheets

(51) Int. Cl.
*F16F 9/18* (2006.01)
*F16F 9/19* (2006.01)

(56) References Cited

U.S. PATENT DOCUMENTS

| | | | | |
|---|---|---|---|---|
| 7,216,747 B2* | 5/2007 | Breese | ............ | F16F 9/062 188/315 |
| 8,616,351 B2* | 12/2013 | Roessle | ............ | F16F 9/348 188/266.5 |
| 2011/0192157 A1* | 8/2011 | Ogawa | ............ | B61F 5/245 60/469 |
| 2013/0248306 A1* | 9/2013 | Ogawa | ............ | B61F 5/24 188/266.2 |
| 2014/0083807 A1* | 3/2014 | Ogawa | ............ | B61F 5/245 188/314 |
| 2014/0090941 A1* | 4/2014 | Shibahara | ............ | F16F 9/18 188/315 |
| 2014/0196628 A1* | 7/2014 | Ogawa | ............ | B61F 5/24 105/199.1 |

FOREIGN PATENT DOCUMENTS

| | | |
|---|---|---|
| JP | 60-184448 U1 | 12/1985 |
| JP | 08-326823 A | 12/1996 |
| JP | 2000-283210 A | 10/2000 |
| JP | 2003-042216 A | 2/2003 |
| JP | 2003074614 A | 3/2003 |
| JP | 2007-321909 A | 12/2007 |
| JP | 2011094722 A | 5/2011 |

\* cited by examiner

DAMPER

TECHNICAL FIELD

The present invention relates to a damper.

BACKGROUND ART

In general, a damper includes, for example, a cylinder, a piston slidably inserted into the cylinder, a rod that is inserted into the cylinder and connected to the piston, a rod-side chamber and a piston-side chamber that are divided within the cylinder by the piston, and a damping passage that allows communication between the rod-side chamber and the piston-side chamber. A damping force is exerted in accordance with an extending/contracting operation in which the piston displaces in an axial direction relative to the cylinder to suppress the oscillation of an object to be damped.

The above-described damper exerts a damping force in a direction to suppress extension/contraction during a stroke regardless of whether it extends or contracts. However, for example, in a damper used to damp a building or the like, there are cases in which the oscillation of the building actually cannot be reduced when a damping force is exerted depending on the stroke position. Therefore, for example, in the damper disclosed in JP2007-321909A, a bypass path that bypasses a damping valve at the stroke end is opened to allow communication between the rod-side chamber and the piston-side chamber.

SUMMARY OF INVENTION

In the above-described damper, the damping force can be changed depending on not only the stroke position but also the stroke direction. However, since the valve structure is complicated and large, there has been a problem in that the overall damper becomes large and thus the costs increase and become uneconomical.

The present invention was created in consideration of the above-described problems, and an object thereof is to provide a damper that is small and inexpensive.

According to one aspect of the present invention, a damper includes a cylinder, a piston slidably inserted into the cylinder, a rod that is inserted into the cylinder and connected to the piston, a rod-side chamber and a piston-side chamber that are divided within the cylinder by the piston, a tank, an extension-side passage that allows communication between the rod-side chamber and the tank, a compression-side passage that allows communication between the piston-side chamber and the tank, an extension-side damping valve that is provided in the extension-side passage and applies resistance to a flow of liquid from the rod-side chamber toward the tank, a first check valve that is provided in the extension-side passage in parallel with the extension-side damping valve and allows only passage of liquid from the tank to the rod-side chamber, a compression-side damping valve that is provided in the compression-side passage and applies resistance to a flow of liquid from the piston-side chamber toward the tank, a second check valve that is provided in the compression-side passage in parallel with the compression-side damping valve and allows only passage of liquid from the tank to the piston-side chamber, and a center passage that allows communication between the tank and the inside of the cylinder.

DESCRIPTION OF EMBODIMENTS

Figure 1:
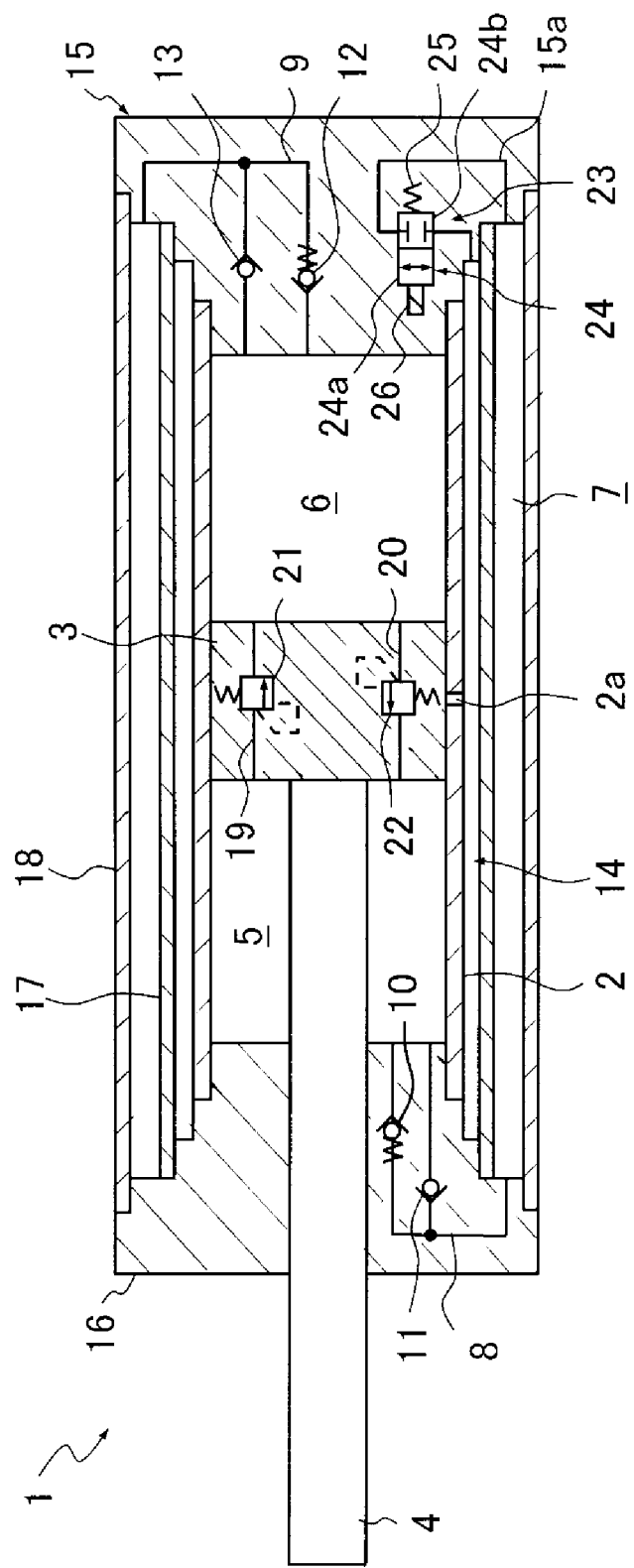
FIG. 1 is a schematic view of a damper according to an embodiment of the present invention.

An embodiment of the present invention will now be explained below referring to the drawings.

As shown in FIG. 1, a damper 1 includes a cylinder 2, a piston 3 slidably inserted into the cylinder 2, a rod 4 that is inserted into the cylinder 2 and connected to the piston 3, a rod-side chamber 5 and a piston-side chamber 6 that are divided within the cylinder 2 by the piston 3, a tank 7, an extension-side passage 8 that allows communication between the rod-side chamber 5 and the tank 7, a compression-side passage 9 that allows communication between the piston-side chamber 6 and the tank 7, an extension-side damping valve 10 that is provided in the extension-side passage 8 and applies resistance to a flow of liquid from the rod-side chamber 5 toward the tank 7, a first check valve 11 that is provided in the extension-side passage 8 in parallel with the extension-side damping valve 10 and allows only the passage of liquid from the tank 7 to the rod-side chamber 5, a compression-side damping valve 12 that is provided in the compression-side passage 9 and applies resistance to a flow of liquid from the piston-side chamber 6 toward the tank 7, a second check valve 13 that is provided in the compression-side passage 9 in parallel with the compression-side damping valve 12 and allows only the passage of liquid from the tank 7 to the piston-side chamber 6, and a center passage 14 that allows communication between the tank 7 and the inside of the cylinder 2. A liquid such as a hydraulic oil is filled in the rod-side chamber 5 and the piston-side chamber 6, and a gas other than a liquid is filled in the tank 7. It is not necessary to create a pressurized state within the tank 7 by compressing and filling the gas, but a pressurized state can be created.

Each part mentioned above will be explained in detail below. The cylinder 2 is cylindrical, and one end thereof is blocked by a lid 15, while an annular rod guide 16 is attached to the other end thereof. The rod 4 is slidably inserted through the rod guide 16. One end of the rod 4 protrudes to the outside of the cylinder 2, while the other end is connected to the piston 3 slidably inserted into the cylinder 2.

A space between the outer periphery of the rod 4 and the rod guide 16 is sealed by a sealing member (not illustrated), and thereby the inside of the cylinder 2 is in a sealed state. Hydraulic oil is filled as a liquid into the rod-side chamber 5 and the piston-side chamber 6 that are divided within the cylinder 2 by the piston 3. Further, an intermediate tube 17 is provided on the outer periphery of the cylinder 2 forms the center passage 14 by an annular gap formed between the intermediate tube 17 and the cylinder 2. An outer tube 18 is provided on the outer periphery of the intermediate tube 17 forms the tank 7 by an annular gap formed between the outer tube 18 and the intermediate tube 17. Both ends of the intermediate tube 17 and the outer tube 18 are blocked by the lid 15 and the rod guide 16.

The end of the rod 4 that protrudes to the outside of the cylinder 2 and the lid 15 that blocks one end of the cylinder 2, the intermediate tube 17, and the outer tube 18 include attachment parts (not illustrated), such that the damper 1 can be interposed into an object to be damped, such as a space between a building and a foundation that is fixed to the ground or a space between a beam of an upper floor and a beam of a lower floor in a building.

The rod-side chamber 5 and the piston-side chamber 6 are in communication via an extension-side relief passage 19 and a compression-side relief passage 20 provided on the piston 3. In the extension-side relief passage 19, an extension-side relief valve 21 is provided to open when the pressure in the rod-side chamber 5 exceeds the pressure in the piston-side chamber 6 by a predetermined amount so as to open the extension-side relief passage 19 and allow pressure within the rod-side chamber 5 to escape to the piston-side chamber 6. Further, in the compression-side relief passage 20, a compression-side relief valve 22 is provided to open when the pressure in the piston-side chamber 6 exceeds the pressure in the rod-side chamber 5 by a predetermined amount so as to open the compression-side relief passage 20 and allow pressure within the piston-side chamber 6 to escape to the rod-side chamber 5. The installation of the extension-side relief valve 21 and the compression-side relief valve 22 is optional, but providing them allows for the prevention of excessive pressure in the cylinder 2 and protection of the damper 1.

The extension-side passage 8 that allows communication between the rod-side chamber 5 and the tank 7, the extension-side damping valve 10, and the first check valve 11 are provided on the rod guide 16. The extension-side damping valve 10 is a passive damping valve, and applies resistance to a flow of passing liquid while allowing only a flow of liquid from the rod-side chamber 5 toward the tank 7. The first check valve 11 allows only the passage of liquid from the tank 7 to the rod-side chamber 5.

The compression-side passage 9 that allows communication between the piston-side chamber 6 and the tank 7, the compression-side damping valve 12, and the second check valve 13 are provided on the lid 15. The compression-side damping valve 12 is a passive damping valve, and applies resistance to a flow of passing liquid while allowing only a flow of liquid from the piston-side chamber 6 toward the tank 7. The second check valve 13 allows only the passage of liquid from the tank 7 to the piston-side chamber 6.

When the piston 3 is in a neutral position relative to the cylinder 2, a through hole 2a that allows communication between the inside and the outside of the cylinder 2 is provided at a position of the cylinder 2 that faces the piston 3, which in this case is at the center of the cylinder 2. Thereby, the inside of the cylinder 2 is in communication with an annular gap formed between the cylinder 2 and the intermediate tube 17. The neutral position of the piston 3 is not necessarily limited to the center of the cylinder 2, and it can be arbitrarily set. In the present embodiment, the position at which the through hole 2a is formed in the cylinder 2 coincides with the stroke center of the piston 3.

On the lid 15, a connecting path 15a is provided to allow communication between the annular gap formed between the cylinder 2 and the intermediate tube 17 and the tank 7. The center passage 14 is formed by the annular gap between the cylinder 2 and the intermediate tube 17, the through hole 2a, and the connecting path 15a. The inside of the cylinder 2 is in communication with the tank 7 via the center passage 14 except when facing the piston 3 such that the through hole 2a is blocked.

In the center passage 14, or more specifically in the connecting path 15a, an opening/closing valve 23 is provided such that it can switch between a state in which the center passage 14 is opened and a state in which the center passage 14 is blocked. The opening/closing valve 23 is an electromagnetic opening/closing valve that includes a valve main body 24 having a communication position 24a that opens the center passage 14 and a blocking position 24b that blocks the center passage 14, a spring 25 that biases the valve main body 24 to position it in the blocking position 24b, and a solenoid 26 that switches the valve main body 24 to the communication position 24a against the biasing force of the spring 25 upon energization. The opening/closing valve 23 can also be configured as an opening/closing valve that is opened/closed by a manual operation instead of an electromagnetic valve.

Next, the operation of the damper 1 will be explained, beginning with the case in which the opening/closing valve 23 blocks the center passage 14.

When the piston 3 moves toward the rod guide 16 side relative to the cylinder 2, or in other words when the damper 1 executes an extension operation, the rod-side chamber 5 is compressed and liquid is discharged from the rod-side chamber 5 to the tank 7 through the extension-side passage 8. At this time, since resistance is applied to the flow of liquid by the extension-side damping valve 10, the pressure within the rod-side chamber 5 rises corresponding to the pressure loss of the extension-side damping valve 10. Meanwhile, the second check valve 13 opens so that liquid is supplied from the tank 7 to the expanding piston-side chamber 6, and thus the pressure within the piston-side chamber 6 reaches tank pressure. Thereby, the pressure of the rod-side chamber 5 becomes higher than the pressure of the piston-side chamber 6, and the damper 1 exerts a damping force in a direction to suppress the extension at a size corresponding to the difference between the pressure of the rod-side chamber 5 and the pressure of the piston-side chamber 6.

On the other hand, when the piston 3 moves toward the lid 15 side, or in other words when the damper 1 executes a contraction operation, the piston-side chamber 6 is compressed and liquid is discharged from the piston-side chamber 6 to the tank 7 through the compression-side passage 9. At this time, since resistance is applied to the flow of liquid by the compression-side damping valve 12, the pressure within the piston-side chamber 6 rises corresponding to the pressure loss of the compression-side damping valve 12. Meanwhile, the first check valve 11 opens so that liquid is supplied from the tank 7 to the expanding rod-side chamber 5, and thus the pressure within the rod-side chamber 5 reaches tank pressure. Thereby, the pressure of the piston-side chamber 6 becomes higher than the pressure of the rod-side chamber 5, and the damper 1 exerts a damping force in a direction to suppress the contraction at a size corresponding to the difference between the pressure of the piston-side chamber 6 and the pressure of the rod-side chamber 5.

Therefore, when the opening/closing valve 23 blocks the center passage 14, the damper 1 exerts a damping force during the stroke in both the extension operation and the contraction operation similar to a general damper.

Next, the case in which the opening/closing valve 23 opens the center passage 14 will be explained.

First, when the piston 3 is more toward the rod guide 16 side than the through hole 2a of the center passage 14 and the piston 3 strokes toward a direction that compresses the rod-side chamber 5, or in other words the direction of the rod guide 16, the rod-side chamber 5 is compressed and resistance can be applied by the extension-side damping valve 10 to the flow of liquid discharged from the rod-side chamber 5 to the tank 7 through the extension-side passage 8. Further, since liquid is supplied to the expanding piston-side chamber 6 from the tank 7 via the center passage 14 and the compression-side passage 9, the damper 1 exerts a damping force that counters the extension.

On the other hand, when the piston 3 is more toward the rod guide 16 side than the through hole 2a of the center passage 14 and the piston 3 strokes toward a direction that compresses the piston-side chamber 6, or in other words the direction of the lid 15, the piston-side chamber 6 communicates with the tank 7 via the center passage 14. Thus, liquid is discharged from the compressed piston-side chamber 6 to the tank 7 through the center passage 14, and the pressure within the piston-side chamber 6 reaches tank pressure. Further, liquid is also supplied to the expanding rod-side chamber 5 from the tank 7 through the extension-side passage 8, and thus the inside of the rod-side chamber 5 also reaches tank pressure. Therefore, a difference cannot be generated between the pressure of the rod-side chamber 5 and the pressure of the piston-side chamber 6, and the damper 1 exerts almost no damping force.

This state is maintained until the center passage 14 is blocked by the piston 3 opposing the through hole 2a. Therefore, the damper 1 exerts no damping force from the state in which the piston 3 is more toward the rod guide 16 side than the through hole 2a until the piston 3 blocks the center passage 14 by strokes toward a direction that compresses the piston-side chamber 6.

When the opening/closing valve 23 opens the center passage 14, the piston 3 is more toward the lid 15 side than the through hole 2a of the center passage 14, and the piston 3 strokes toward a direction that compresses the piston-side chamber 6, or in other words strokes toward the lid 15 side, the piston-side chamber 6 is compressed and resistance can be applied by the compression-side damping valve 12 to the flow of liquid discharged from the piston-side chamber 6 to the tank 7 through the compression-side passage 9. Further, since liquid is supplied to the expanding rod-side chamber 5 from the tank 7 via the center passage 14 and the extension-side passage 8, the damper 1 exerts a damping force that counters the contraction.

On the other hand, when the piston 3 is more toward the lid 15 side than the through hole 2a of the center passage 14 and the piston 3 strokes toward a direction that compresses the rod-side chamber 5, or in other words strokes toward the rod guide 16 side, the rod-side chamber 5 communicates with the tank 7 via the center passage 14. Thus, liquid is discharged from the compressed rod-side chamber 5 to the tank 7 through the center passage 14, and the pressure within the rod-side chamber 5 reaches tank pressure. Further, liquid is also supplied to the expanding piston-side chamber 6 from the tank 7 through the compression-side passage 9, and thus the inside of the piston-side chamber 6 also reaches tank pressure. Therefore, a difference cannot be generated between the pressure of the piston-side chamber 6 and the pressure of the rod-side chamber 5, and the damper 1 exerts almost no damping force.

This state is maintained until the center passage 14 is blocked by the piston 3 opposing the through hole 2a. Therefore, the damper 1 exerts no damping force from the state in which the piston 3 is more toward the lid 15 side than the through hole 2a until the piston 3 blocks the center passage 14 by strokes toward a direction that compresses the rod-side chamber 5.

In other words, when the opening/closing valve 23 opens the center passage 14, the damper 1 does not exert a damping force against a stroke toward a direction that returns the piston 3 to the center of the cylinder 2 but does exert a damping force only against a stroke toward a direction that separates the piston 3 from the center of the cylinder 2.

In this way, according to the present embodiment, by providing the center passage 14, a constitution in which a damping force is exerted when the piston 3 separates from the neutral position and a damping force is not exerted when the piston 3 returns to the neutral position can be achieved without using a large valve with a complex structure in which the bypass is opened/closed in tandem with the stroke of the damper 1. Therefore, the size of the damper 1 can be reduced and the costs can also be lowered.

Further, in this way, if the damper 1 is configured such that a damping force is not exerted when the piston 3 returns to the neutral position and a damping force is exerted when the piston 3 separates from the neutral position, the piston 3 becomes easier to return to the neutral position compared to a damper in which a damping force is continuously exerted in both directions during the stroke. Thus, superior oscillation insulation performance can be achieved by using the damper 1 and a spring S in parallel between an object to be damped O and an oscillation input-side part I as shown in FIG. 2.

Figure 2:
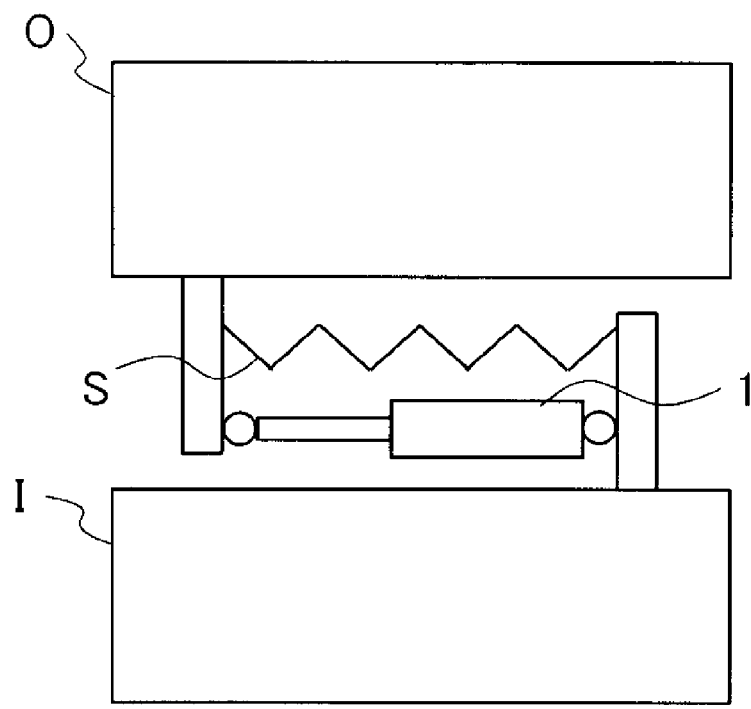
FIG. 2 illustrates a state in which the damper according to an embodiment of the present invention is interposed between an object to be damped and an oscillation input-side part.
Figure 3:
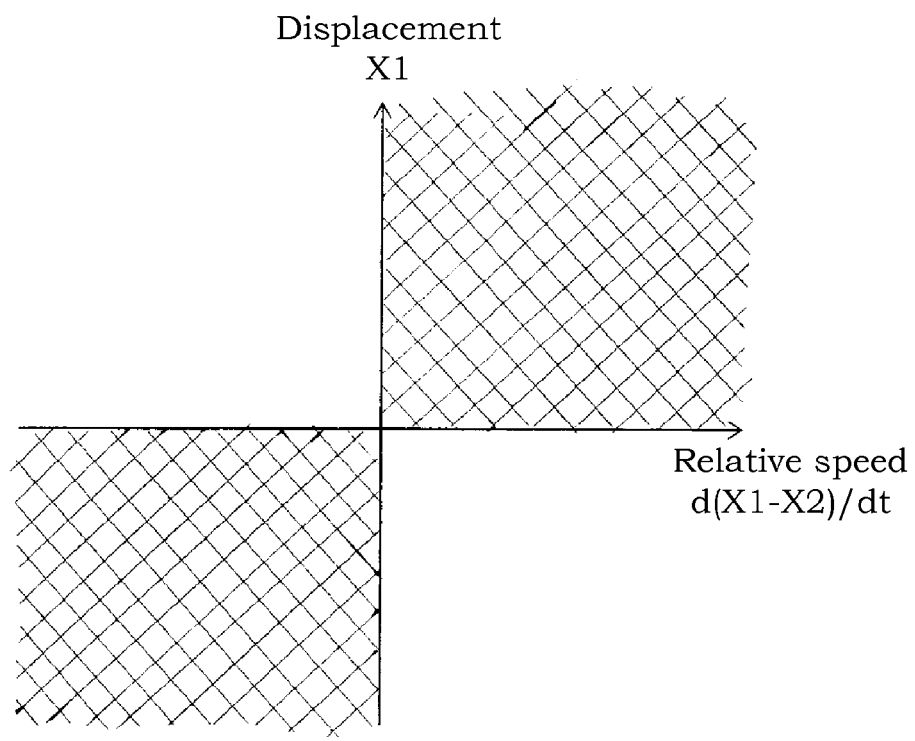
FIG. 3 explains a state in which the damper according to an embodiment of the present invention does not exert a damping force and a state in which it exerts a damping force.

Herein, in FIG. 2, if displacement in the left-right direction of the object to be damped O is regarded as X1, displacement in the left-right direction of the oscillation input-side part I is regarded as X2, relative speed of the object to be damped O and the oscillation input-side part I is $d(X1-X2)/dt$, displacement in the right direction in FIG. 2 is regarded as positive, displacement X1 is placed on the vertical axis, and relative speed $d(X1-X2)/dt$ is placed on the horizontal axis, the exertion of a damping force by the damper 1 exhibits in the first quadrant state and the third quadrant state as shown by the meshed areas in FIG. 3.

Figure 4:
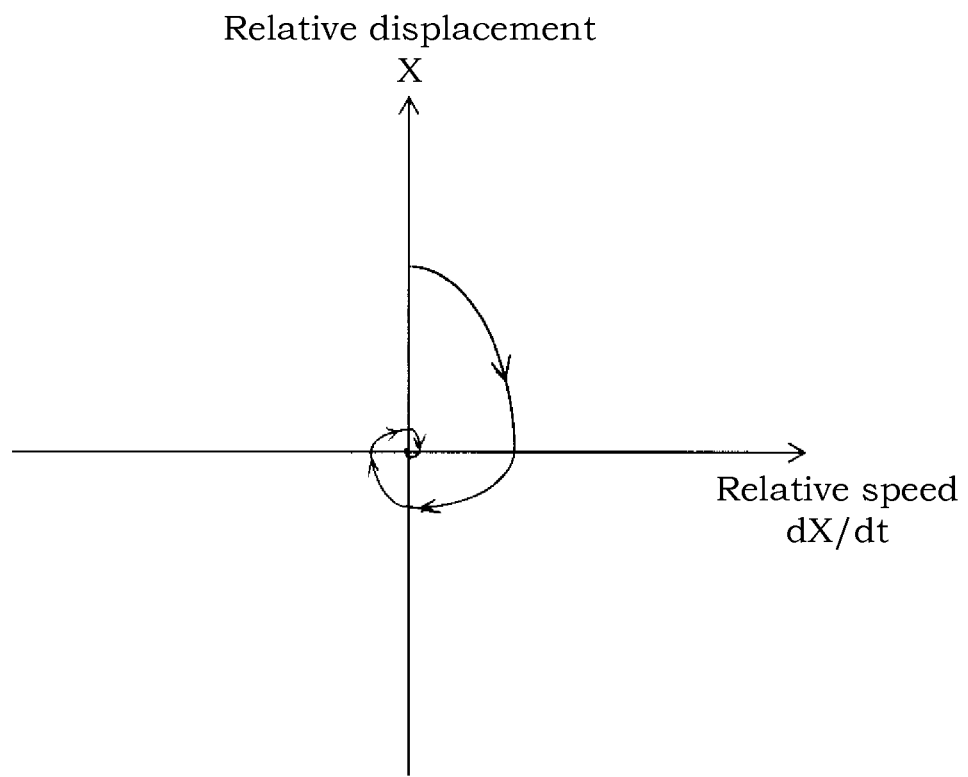
FIG. 4 illustrates a trajectory of relative displacement and relative speed of an object to be damped and an oscillation input-side part to which the damper according to an embodiment of the present invention is applied.

When the damper 1 exerts a damping force, it is equivalent to a increase in the apparent rigidity of the spring S, and when the damper 1 does not exert a damping force, it is equivalent to a decrease in the apparent rigidity of the spring S. Therefore, if the relative displacement of the oscillation input-side part I and the object to be damped O is regarded as X and the relative speed is regarded as $dX/dt$, when the object to be damped O is displaced relative to the oscillation input-side part I, the trajectory converges on the starting point in a phase plane of the relative displacement X and the relative speed $dX/dt$ as shown in FIG. 4. In other words, the trajectory is asymptotically stable and does not diverge. Therefore, by using the damper 1 together with the spring S, a system with superior oscillation insulation can be constructed.

In the damper 1, the opening position of the center passage 14 is a position at the center of the cylinder 2 opposing the stroke center of the piston 3. Therefore, there are no deviations in either direction within the stroke range in which a damping force is not exerted when the piston 3 returns to the stroke center, and the entire stroke length of the damper 1 can be utilized effectively.

Further, since the opening/closing valve 23 is provided in the center passage 14 in the present embodiment, the same function as a general damper in which a damping force is necessarily exerted during the stroke can be exhibited. Therefore, the damper 1 can be made to function as a general damper as necessary, while also being able to exhibit a function of increasing the oscillation insulation by not exerting a damping force when the piston 3 returns to the neutral position. The opening/closing valve 23 can also be set so that it enters the communication position 24a when electric power is not supplied.

It is also possible to configure the damper 1 such that when the opening/closing valve 23 enters the communication position 24a, resistance is applied to a flow of passing liquid, and a small damping force is exerted when the piston 3 strokes toward a direction in which it returns to the neutral position. In this case, the amount of energy absorption of the damper 1 increases, and this is advantageous because the oscillation of the object to be damped becomes easier to converge in a short amount of time.

In addition, the damper 1 has a triple-tube structure consisting of the cylinder 2, the intermediate tube 17, and the outer tube 18. Therefore, the installation of the center passage 14 is easy and the tank 7 can also be arranged on the outer periphery of the cylinder 2, and thus the overall size of the damper 1 can be reduced.

Figure 5:
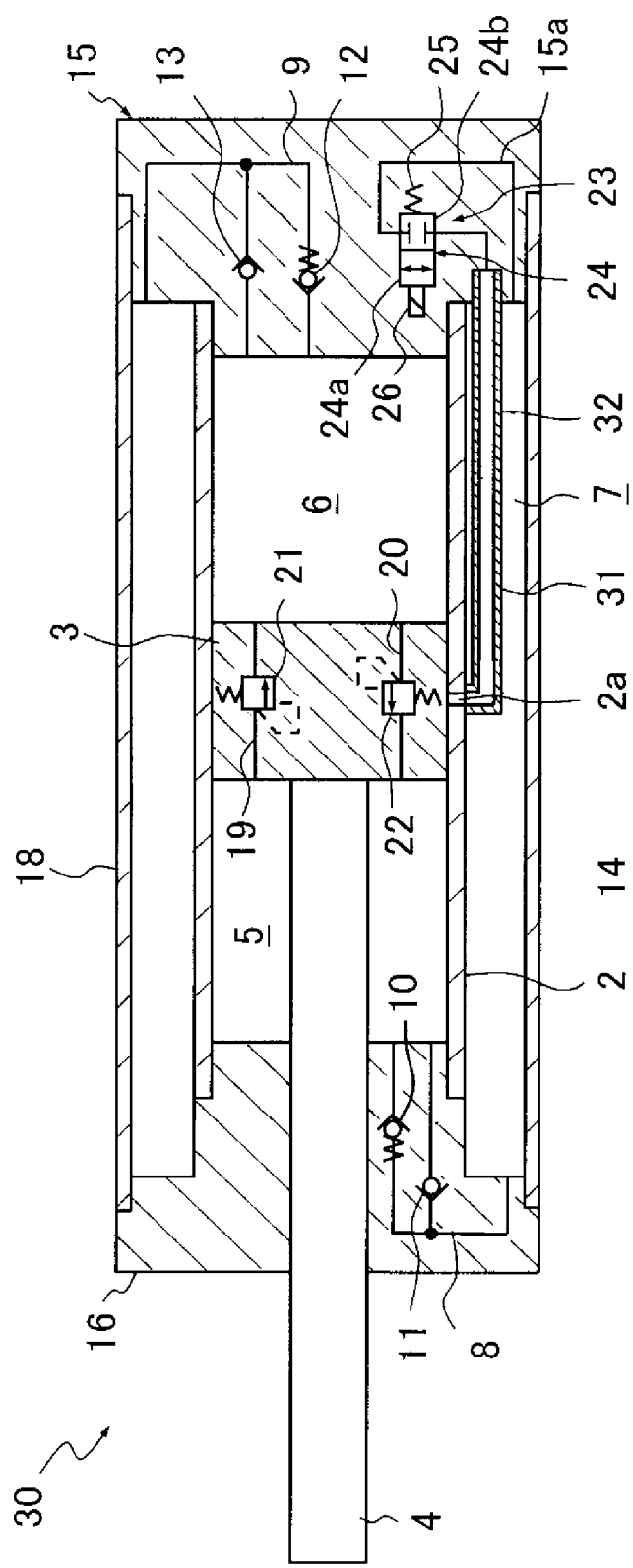
FIG. 5 is a schematic view of an alternative embodiment of a damper according to an embodiment of the present invention.

As described above, the damper 1 employs a triple-tube structure including the intermediate tube 17 in the formation of the center passage 14. However, the damper can also be configured like the damper 30 shown in FIG. 5, in which the intermediate tube 17 is eliminated and a pipe 31 that connects the through hole 2a and the connecting path 15a is provided in the tank 7, such that a center passage 32 is formed by the pipe 31, the through hole 2a, and the connecting path 15a. The other constitutions of the damper 30 are the same as those of the damper 1, and thus the same reference signs are assigned thereto and explanations thereof will be omitted.

In this way, if the center passage 32 is formed using the pipe 31, the weight of the damper 30 can be reduced.

Embodiments of this invention were described above, but the above embodiments are merely examples of applications of this invention, and the technical scope of this invention is not limited to the specific constitutions of the above embodiments.

For example, in the dampers 1 and 30, the extension-side damping valve 10 and the first check valve 11 are provided on the lid 15 and the compression-side damping valve 12 and the second check valve 13 are provided on the rod guide 16. Therefore, the size of the damper 1 can be further reduced. However, the positions for installing the extension-side damping valve 10, the first check valve 11, the compression-side damping valve 12, and the second check valve 13 are not limited to the lid 15 and the rod guide 16, and these members can be arranged at other positions. The structures of the center passages 14 and 32 are also not limited to those described above.

With respect to the above description, the contents of application No. 2012-185372, with a filing date of Aug. 24, 2012 in Japan, are incorporated herein by reference.

The invention claimed is:

1. A damper comprising:
   a cylinder,
   a piston slidably inserted into the cylinder,
   a rod that is inserted into the cylinder and connected to the piston,
   a rod-side chamber and a piston-side chamber that are divided within the cylinder by the piston,
   a tank,
   an extension-side passage that allows communication between the rod-side chamber and the tank,
   a compression-side passage that allows communication between the piston-side chamber and the tank,
   an extension-side damping valve that is provided in the extension-side passage and applies resistance to a flow of liquid from the rod-side chamber toward the tank,
   a first check valve that is provided in the extension-side passage in parallel with the extension-side damping valve and allows only passage of liquid from the tank to the rod-side chamber,
   a compression-side damping valve that is provided in the compression-side passage and applies resistance to a flow of liquid from the piston-side chamber toward the tank,
   a second check valve that is provided in the compression-side passage in parallel with the compression-side damping valve and allows only passage of liquid from the tank to the piston-side chamber, and
   a center passage that allows communication between the tank and the inside of the cylinder, wherein
   an opening position of the center passage into the cylinder is coincident with a stroke center of the piston.

2. The damper according to claim 1, further comprising an opening/closing valve that opens/closes the center passage and is provided in the center passage.

3. The damper according to claim 2, wherein the opening/closing valve applies resistance to a flow of liquid through the center passage in a communication position that opens the center passage.

4. The damper according to claim 1, further comprising:
   an intermediate tube that is provided on an outer periphery of the cylinder, forming the center passage by an annular gap formed between the intermediate tube and the cylinder, and
   an outer tube that is provided on an outer periphery of the intermediate tube, forming the tank by an annular gap formed between the outer tube and the intermediate tube.

5. The damper according to claim 1, further comprising:
   an outer tube that is provided on an outer periphery of the cylinder, forming the tank by an annular gap formed between the outer tube and the cylinder, and
   a pipe provided within the tank and forming the center passage.

* * * * *